US011049481B1

(12) United States Patent
Li et al.

(10) Patent No.: US 11,049,481 B1
(45) Date of Patent: Jun. 29, 2021

(54) MUSIC GENERATION SYSTEM

(71) Applicant: Amazon Technologies, Inc., Seattle, WA (US)

(72) Inventors: Liang Li, Mountain View, CA (US); Wayne Chi, Santa Clara, CA (US); Rahul Suresh, Mountain View, CA (US); Dylan Jackson, Newark, CA (US); Haoting Li, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/698,801

(22) Filed: Nov. 27, 2019

(51) Int. Cl.
*G10H 1/18* (2006.01)
*G10H 1/00* (2006.01)
*G06F 16/61* (2019.01)
*G06F 16/11* (2019.01)
*G06F 16/638* (2019.01)
(Continued)

(52) U.S. Cl.
CPC ......... *G10H 1/0066* (2013.01); *G06F 16/116* (2019.01); *G06F 16/61* (2019.01); *G06F 16/638* (2019.01); *G06N 3/04* (2013.01); *G06N 3/08* (2013.01); *G10H 1/0008* (2013.01); *G10H 2220/126* (2013.01); *G10H 2240/081* (2013.01)

(58) Field of Classification Search
CPC ...... G06N 5/02; G06N 3/049; G06Q 30/0643; G06F 16/9024; G06F 16/29; G06F 16/283; G06F 16/904; G06F 17/16; G06F 16/13; G06F 1/16; G06T 2200/24; G06T 17/00; G06T 13/80; G06T 11/00; G10H 1/0025; G10H 2210/066; G10H 2240/131; G10H 2240/325; G10H 2210/031; G10H 2220/126; G10H 2210/071; G10H 2240/141; G10H 2250/311; G10H 1/40; G10H 2240/081; G10H 2210/371; G10H 2210/375; G10H 2240/135; G10H 2220/091; G10H 2240/145; G10H 2240/155; G10H 1/18; G10G 1/00

See application file for complete search history.

(56) References Cited

U.S. PATENT DOCUMENTS 6,987,221 B2 * 1/2006 Platt ..................... G10H 1/0058
84/601
7,227,072 B1 * 6/2007 Weare .................. G10H 1/0008
84/600

(Continued)

*Primary Examiner* — Marlon T Fletcher
(74) *Attorney, Agent, or Firm* — Robert C. Kowert; Kowert, Hood, Munyon, Rankin & Goetzel, P.C.

(57) ABSTRACT

Methods and apparatus for providing metrics for the quality, attributes, and relationships of music including AI-generated music. Music classification and visualization methods are described that involve transforming music files into graphical representations, generating a similarity matrix for the music files using structural similarity techniques, and generating visualizations of the relationships among the music files using multidimensional scaling techniques. Qualitative scoring methods for AI-generated music are described that involve classifying the AI-generated music using a multi-genre classifier, generating a similarity metric for the AI-generated music to other genres using structural similarity techniques and multidimensional scaling techniques, and generating a qualitative score for the music using confidence in the classification in combination with the similarity metric.

23 Claims, 13 Drawing Sheets

(51) Int. Cl.
*G06N 3/04* (2006.01)
*G06N 3/08* (2006.01)

(56) References Cited

U.S. PATENT DOCUMENTS

| | | | | |
|---|---|---|---|---|
| 8,312,017 | B2 * | 11/2012 | Martin | G06Q 30/0631 |
| | | | | 707/736 |
| 9,143,742 | B1 * | 9/2015 | Amira | H04N 7/181 |
| 10,679,012 | B1 * | 6/2020 | Salimov | G06F 16/283 |
| 10,726,860 | B2 * | 7/2020 | McCallum | G10L 21/0264 |
| 2003/0161396 | A1 * | 8/2003 | Foote | G06F 16/64 |
| | | | | 375/240.01 |
| 2005/0241465 | A1 * | 11/2005 | Goto | G10D 1/00 |
| | | | | 84/616 |
| 2009/0282369 | A1 * | 11/2009 | Jones | G06F 16/26 |
| | | | | 715/848 |
| 2013/0132085 | A1 * | 5/2013 | Mysore | G10H 1/0008 |
| | | | | 704/256.1 |
| 2016/0055420 | A1 * | 2/2016 | Karanam | A61B 5/165 |
| | | | | 700/52 |
| 2016/0379274 | A1 * | 12/2016 | Irwin | G06Q 30/0271 |
| | | | | 705/14.67 |
| 2020/0320398 | A1 * | 10/2020 | Lyske | G06F 17/16 |
| 2020/0395008 | A1 * | 12/2020 | Cohen | G06F 40/284 |

\* cited by examiner

MUSIC GENERATION SYSTEM

BACKGROUND

The field of generative artificial intelligence (AI) has progressed at a remarkable pace, generating more realistic or unique art by the day. Music, as another popular art form, has become a natural next extension for generative AI. However, there are no clearly defined metrics to judge the quality or inherent attributes of the music created. The mostly subjective nature of music makes it difficult to objectively measure the quality of AI-generated musical compositions. For example, if a generative adversarial network (GAN) is trained on a jazz dataset to generate new synthetic Jazz music, there is no metric to clearly evaluate the "jazziness" of the AI-generated music.

Figure 1:
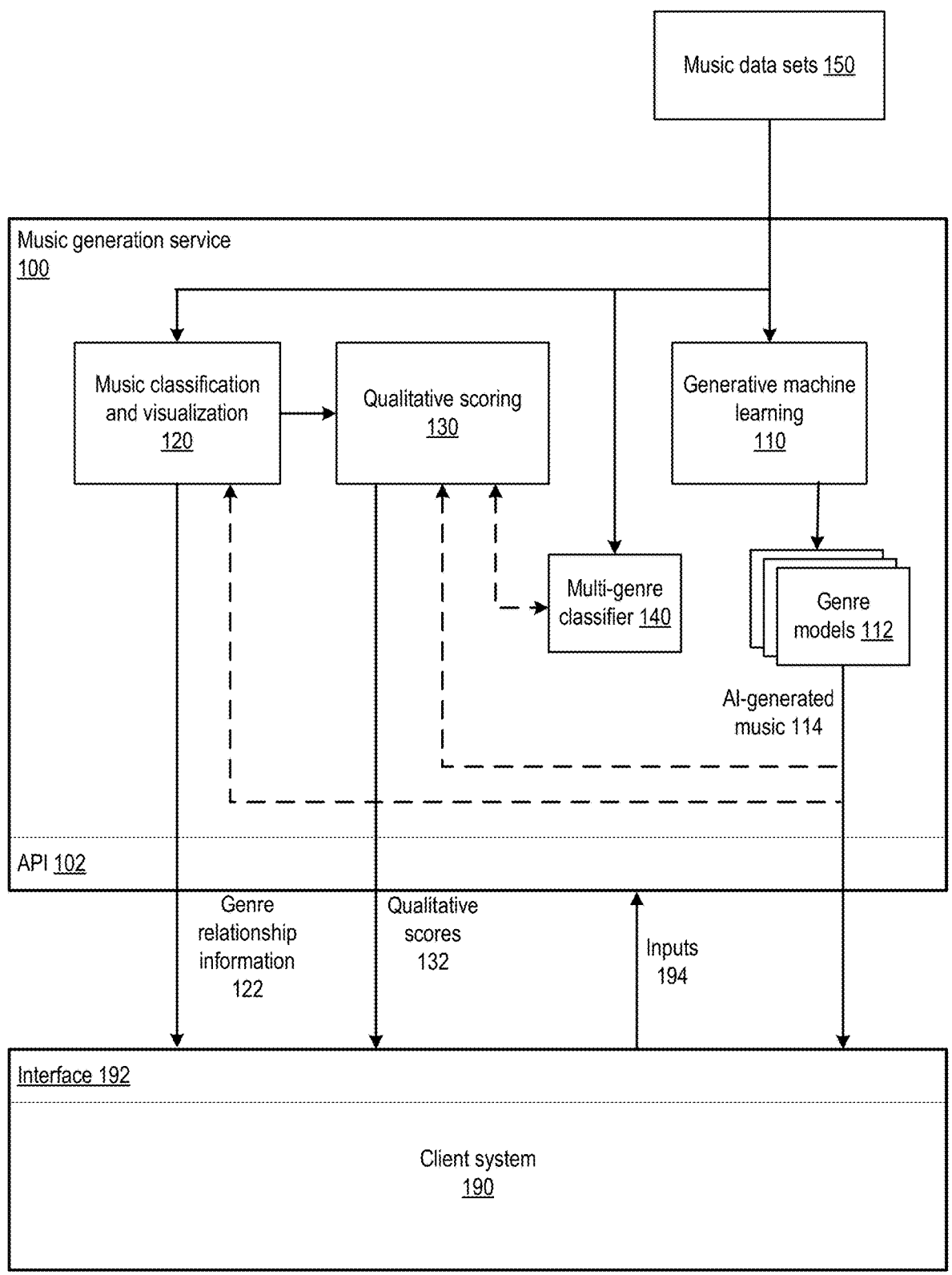
FIG. 1 illustrates a music generation system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for providing metrics for the quality, attributes, and relationships of music including AI-generated music are described. Music generation using generative machine learning (ML) techniques is a growing area of research. However, conventionally there have been no clearly defined metrics for judging the quality or inherent attributes of the generated music. The mostly subjective nature of music makes it difficult to objectively measure the quality of AI-generated musical compositions. For example, if a generative adversarial network (GAN) is trained on a jazz dataset to generate new synthetic Jazz music, there is no metric to clearly evaluate the "jazziness" of the AI-generated music. Embodiments of the methods and apparatus for providing metrics for the quality, attributes, and relationships of music including AI-generated music may, for example, help in advancing the field of music generation using generative machine learning techniques.

Groups of music may share some common patterns/features which can be used to evaluate the similarity or dissimilarity among the music. For instance, rock music is traditionally built on the foundation of simple unsyncopated rhythms in a 4/4 meter, with a repetitive snare drum back beat on beats two and four, while pop music is typically marked by a consistent and noticeable rhythmic element. If the patterns/features of different types of music can be extracted, it is possible to classify evaluate the quality of the music based on criteria revealed from the music patterns/features.

Neural networks have been used to perform feature extraction using convolution. However, these convolutional neural networks have been primarily used in the field of natural image processing where the images have the property of being "stationary", which means that the statistics of one part of the image are the same as any other part. To be more precise, by learning features over a small patch sampled from a larger image, the features may be detected anywhere in the image. By leveraging this technique on graphical representations or "images" of the music generated from music files (e.g., piano files or various types of graphic notation), embodiments may extract features from the music and use the features, for example, in evaluating AI-generated music.

In embodiments, neural networks may be trained to extract features from the music. Similarity among the extracted features may be determined, and potential relationships among different types/patterns of music may be determined and visualized. The relationships and visualizations generated from the features may be based on the fact that the features of two pieces of music may be similar if the music belongs to the same group/type (i.e. genre).

In some embodiments, Musical Instrument Digital Interface (MIDI) files are obtained as input. Piano rolls are generated from the MIDI data. Since the piano rolls are two-dimensional matrixes similar to images, pre-trained models may be applied to the piano rolls to extract features of the music from the piano rolls. A structural similarity (SSIM) technique, conventionally used for image analysis, may then be applied to the extracted features and generate a similarity matrix. A multidimensional scaling (MDS) technique may then be used to reconstruct the relationships of the music. The reconstructed relationships may then be used for visualization or clustering. The output may include a visualization of the relationships among the input music files, and their potential clustering into genres.

While embodiments are generally described as generating "piano rolls" from MIDI files and applying models to the piano rolls to extract features of the music, embodiments may be applied to other graphical representations of music extracted from the input music files, for example spectrograms or various types of graphic notation. A spectrogram is a visual representation of the spectrum of frequencies of a signal as it varies with time. When applied to an audio signal, spectrograms are sometimes called sonographs, voiceprints, or voicegrams. Also note that the input music files may be other types of music files, for example music files of any of various audio file formats including uncompressed, lossless compressed, and lossy compressed audio file formats.

The methods and apparatus for providing metrics for the quality, attributes, and relationships of music including AI-generated music include embodiments of methods for classifying music files or sets of music files (e.g., into genres) and for visualizing the relationships of the music files determined by the classification. These embodiments may be referred to as music classification and visualization systems and methods. The methods for providing metrics for the quality, attributes, and relationships of music including AI-generated music may also include embodiments of methods and apparatus for determining qualitative scores for AI-generated music. These embodiments may be referred to as music qualitative scoring systems and methods. In some embodiments, output of the music classification and visualization system (e.g., structural similarity information for a set of music files or music genres) may be used by the music qualitative scoring system in determining qualitative scores for AI-generated music.

Figure 11:
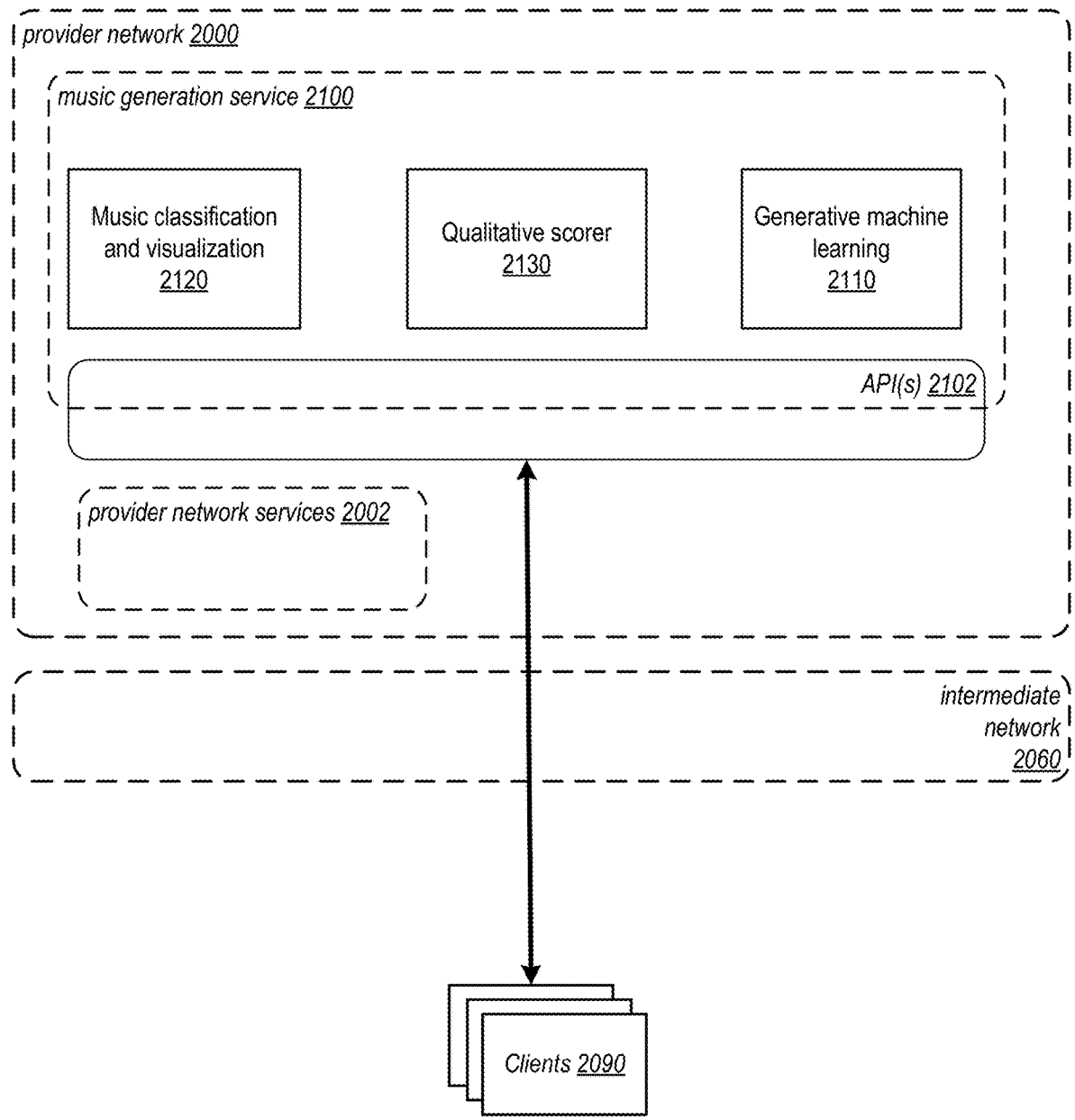
FIG. 11 illustrates a music generator service implemented on a provider network, according to some embodiments.

FIG. 1 illustrates a music generation system, according to some embodiments. In some embodiments, a music classification and visualization system 120 and/or a music qualitative scoring system 130 may be implemented by or in a music generation service 100 that includes generative machine learning technology 110 that allows a user on a client system 190, via an interface 192 to an application programming interface (API) 102 of the music generation service 100, to train models 112 (e.g., generative adversarial network (GAN) models) and to generate music 114 in particular genres from the models 112. Music generation service 100 may be implemented by one or more computing devices, for example one or more server devices, that implement the music generation service 100 logic, and may also include other devices including but not limited to storage devices that, for example, store music data. In some embodiments, the music generation service 100 may be implemented as a provider network service as illustrated in FIG. 11, and thus may be accessed from multiple client systems 190 to generate music 114 in different genres, classify and visualize the relationships among music genres, and generate qualitative scores for their AI-generated music.

In some embodiments, the music generation service 100 may include a music classification and visualization system 120. In some embodiments, the music generation service 100 may include a music qualitative scoring system 130. In some embodiments, the music generation service 100 may include both a music classification and visualization system 120 and a music qualitative scoring system 130. However, in some embodiments, the music classification and visualization system 120 and/or the music qualitative scoring system 130 may be implemented as separate services, for example on a provider network.

Figure 12:
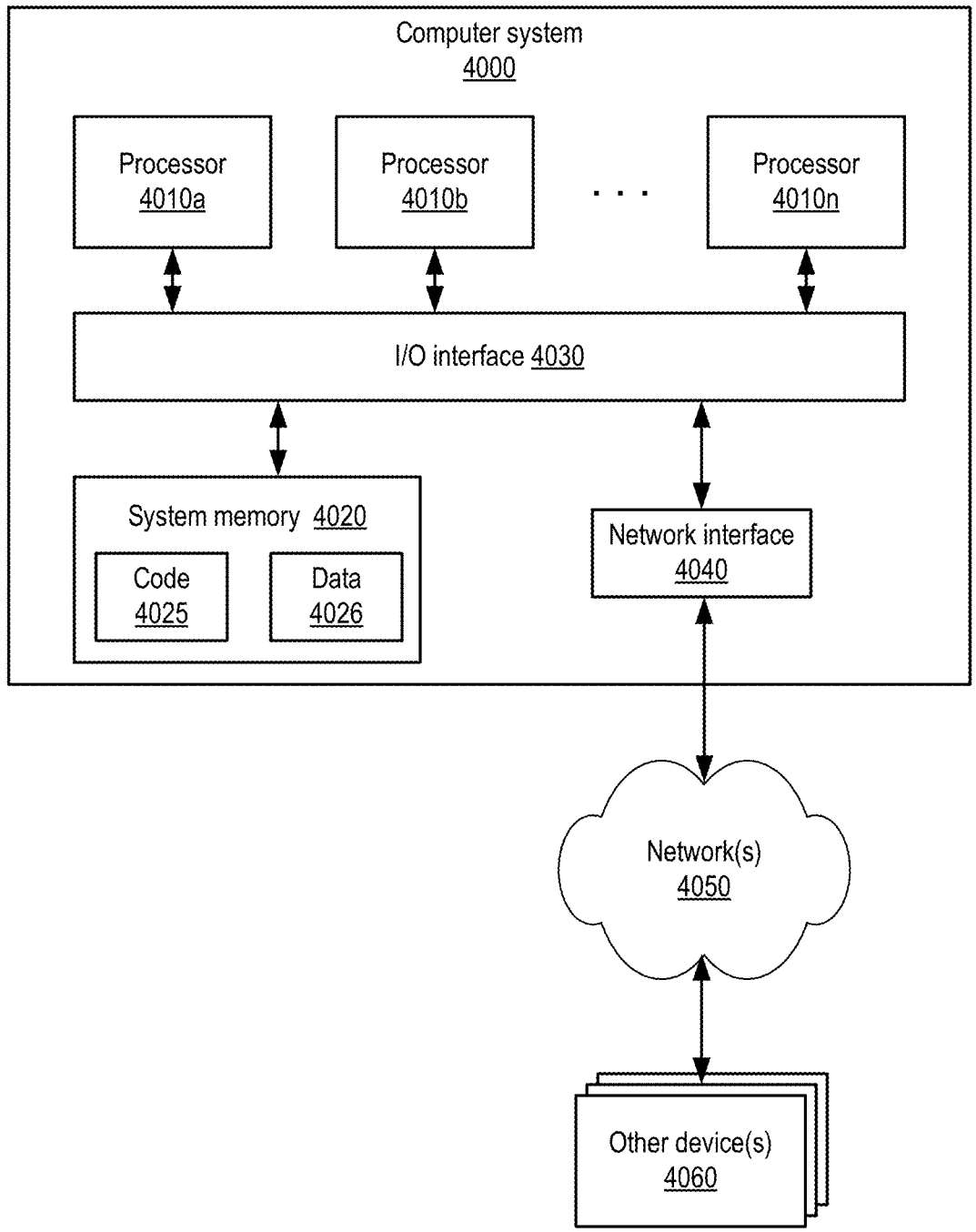
FIG. 12 is a block diagram illustrating an example computer system that may be used in some embodiments.

A client system 190 may be any of a variety of devices including but not limited to desktop computer systems, laptop/notebook computer systems, pad/tablet devices, and smartphone devices. A client system 190 implements an interface (e.g., a graphical user interface (GUI)) via which a user may access the various functionalities of the music generation service 100 via inputs 194 to one or more APIs 102 of the service 100. An example computing device that may be used as a client system 190 is illustrated in FIG. 12.

Music data sets 150 may, for example, include one or more sets or collections of music files (e.g., MIDI files) that may be previously classified into various music genres (e.g., jazz, rock, reggae, pop, Bach, Beethoven, etc.). One or more of the music data sets may, for example, be used by generative machine learning technology 110 to train genre models 112 (e.g., generative adversarial network (GAN) models), for example in response to inputs 194 from client system 190. One or more of the music data sets may also be used to train a multi-genre classifier 140, for example using convolutional neural network (CNN) technology. The multi-genre classifier 140 may, for example, be used by the music qualitative scoring system 130 in generating qualitative scores 132 for AI-generated music 114, for example in response to inputs 194 from client system 190. One or more of the music data sets may also be input to the music classification and visualization system 120 and used to generate genre relationship information 122, for example for AI-generated music 114 in response to inputs 194 from client system 190.

While embodiments of the classification and visualization techniques and the qualitative scoring techniques are described herein in the context of classifying and visualizing relationships among music data including AI-generated music and of providing objective qualitative scores for AI-generated music, the classification and visualization techniques and the qualitative scoring techniques may be applied to other AI-generated content than music. For example, models may be trained on pre-annotated images (e.g., photographs, works of art, drawings, illustrations, designs/plans/blueprints, etc.) of different "genres" (e.g., scenery/landscapes, works of particular artists, nature photographs, portraits, etc.) and used to produce AI-generated images (e.g., "photographs" or "works of art") of particular genres. Similar to the technique shown in FIGS. 9 and 10, a CNN may be trained on ground truth data to classify images. A SSIM technique may be used to determine a genre similarity metric for an AI-generated image, and the CNN may be used to classify the AI-generated image and generate a confidence metric for the classification. The genre similarity metric and the confidence metric may then be used to calculate a qualitative score for the AI-generated image.

Music Classification and Visualization

FIGS. 2 through 8 illustrate music classification and visualization systems and methods, according to some embodiments. To help visualize the potential relationships among different types of music, embodiments of a music classification and visualization system are described that may utilize structural similarity (SSIM) and multidimensional scaling (MDS) for classifying and visualizing music data sets.

Structural similarity (SSIM) is a method for measuring the similarity between two images. Different from traditional method such as MSE (mean square error) or PSNR (peak signal-to-noise ratio) that estimate absolute errors, SSIM is a perception-based model that considers image degradation as perceived change in structural information, while also incorporating important perceptual phenomena, including both luminance masking and contrast masking terms. Multidimensional scaling (MDS) is a method for visualizing the level of similarity of individual cases of a dataset. It takes an input matrix giving dissimilarities between pairs of items and outputs a coordinate matrix in which the configuration minimizes a loss function referred to as strain.

Figure 2:
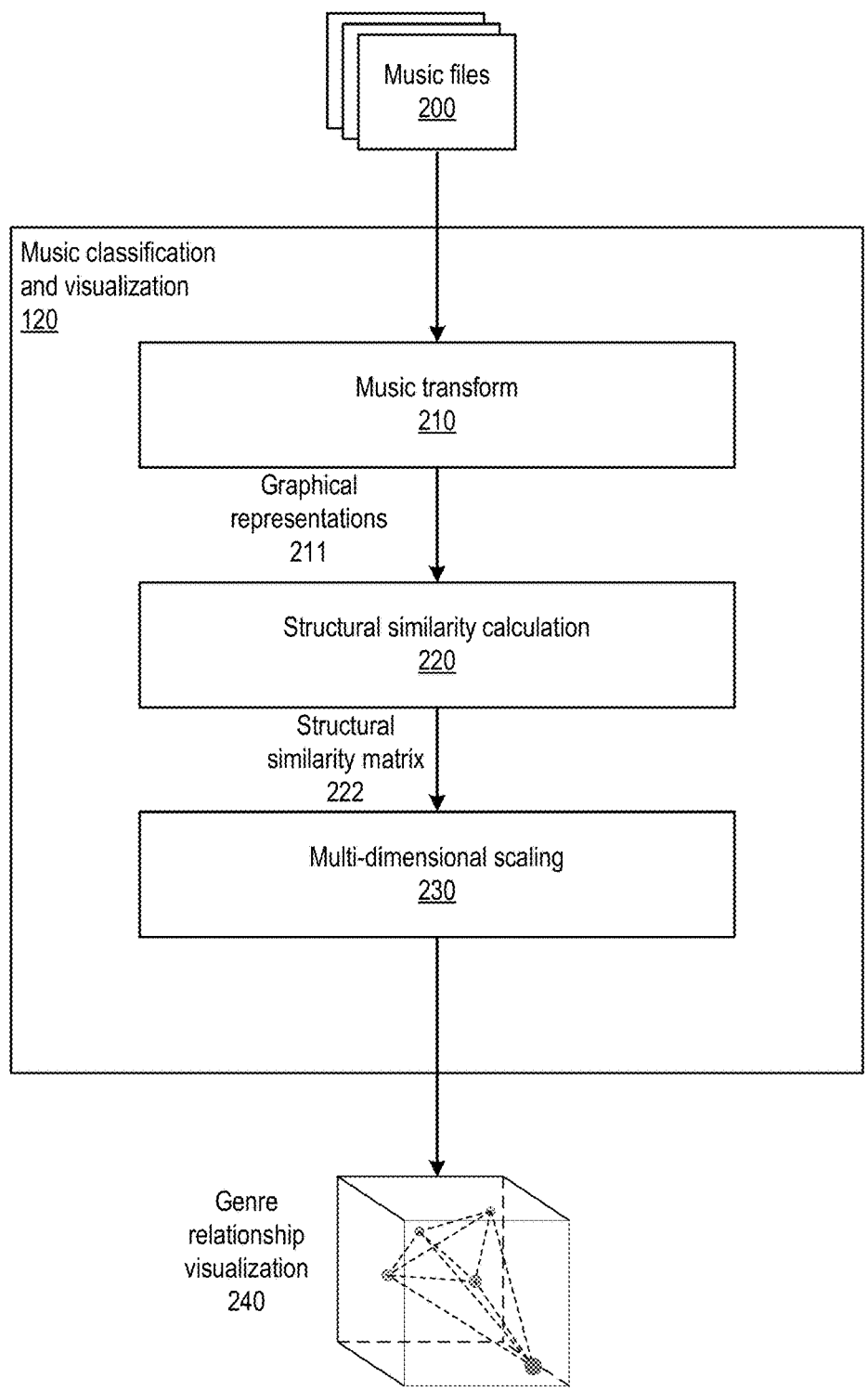
FIG. 2 illustrates a music classification and visualization system, according to some embodiments.
Figure 3:
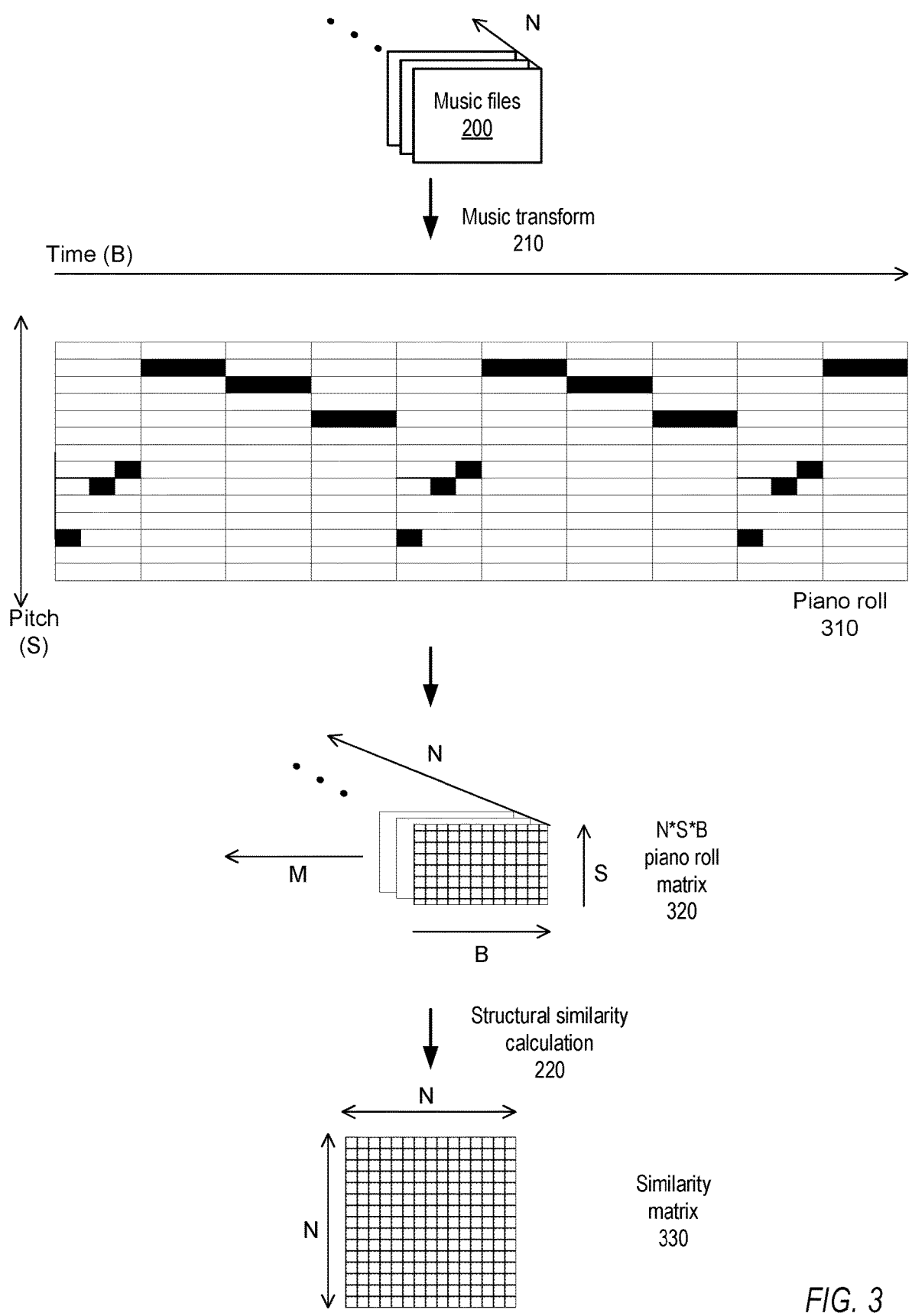
FIG. 3 illustrates generating a similarity matrix from input music files, according to some embodiments.

FIG. 2 illustrates a music classification and visualization system 120 as illustrated in FIG. 1, according to some embodiments. Embodiments of the music classification and visualization system 120 may process input music files 200 (e.g., MIDI (Musical Instrument Digital Interface—a technical standard to store music data) to generate visualizations 240 of the relationship between different music types or genres. A core idea is that the patterns of music in the music (e.g. MIDI) files 200 may be similar if the music belongs to the same genre. Thus, the music classification and visualization system 120 may apply a transform 210 to the music data in a set of music files 200 (e.g., MIDI files) to generate graphical representations 211 in a graphical format (e.g., a piano roll format as illustrated in FIG. 3), and apply a structural similarity technique 220 to the graphical format data 211 to generate similarity information (e.g., a similarity matrix 222) for the set of music files 200. In some embodiments of a structural similarity technique 220, one or more pre-trained neural network models are applied to the graphical format data 211 to extract one or more features from the data 211 (e.g., features extracted from pitch or from other aspects of the music data), and then a SSIM technique is applied to the extracted features to generate a similarity matrix 222.

Figure 6A:
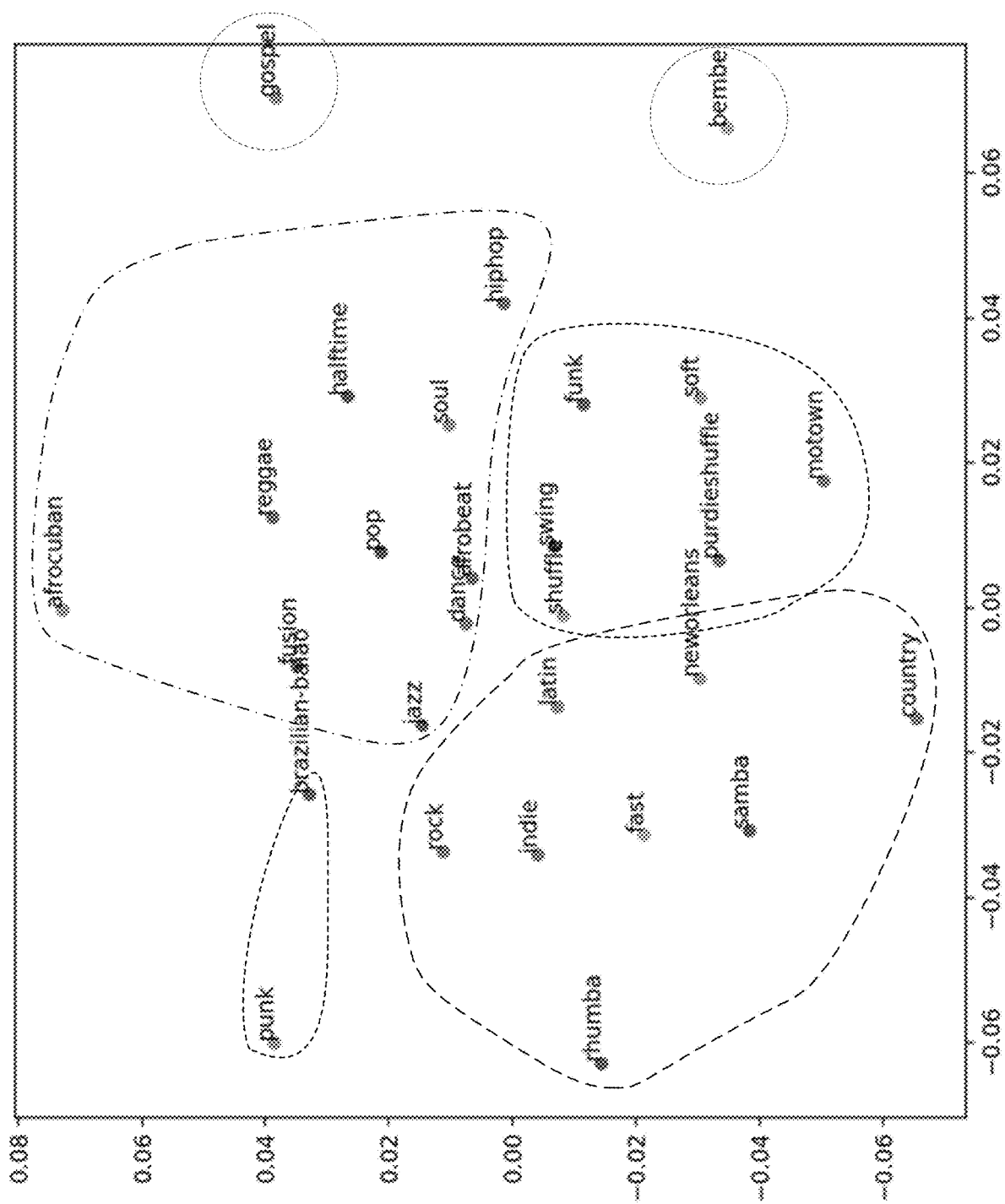
FIGS. 6A and 6B show an example two-dimensional visualization of further grouping of the musical genres of FIG. 5 using Euclidian distance, according to some embodiments.
Figure 6B:
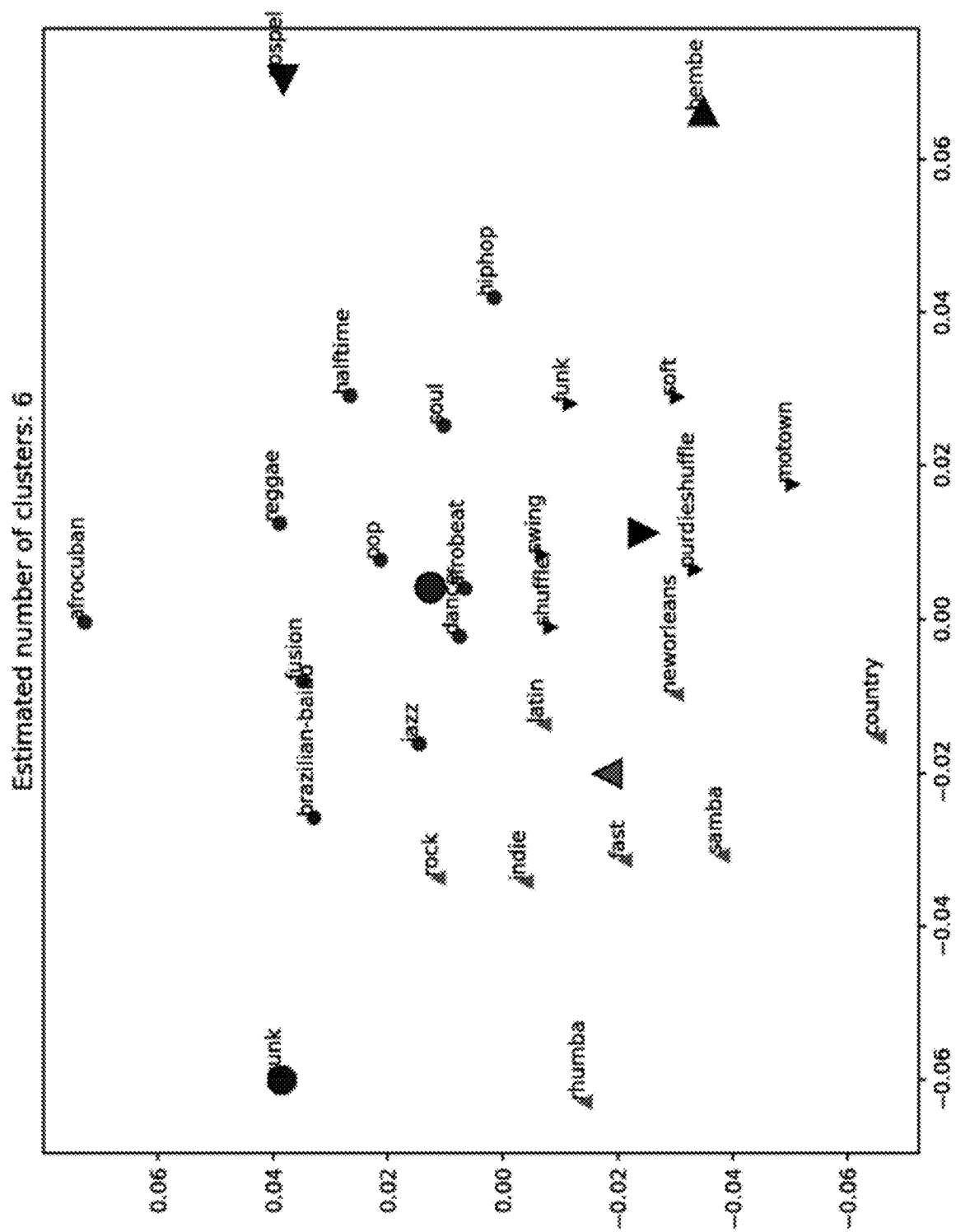
Figure 7:
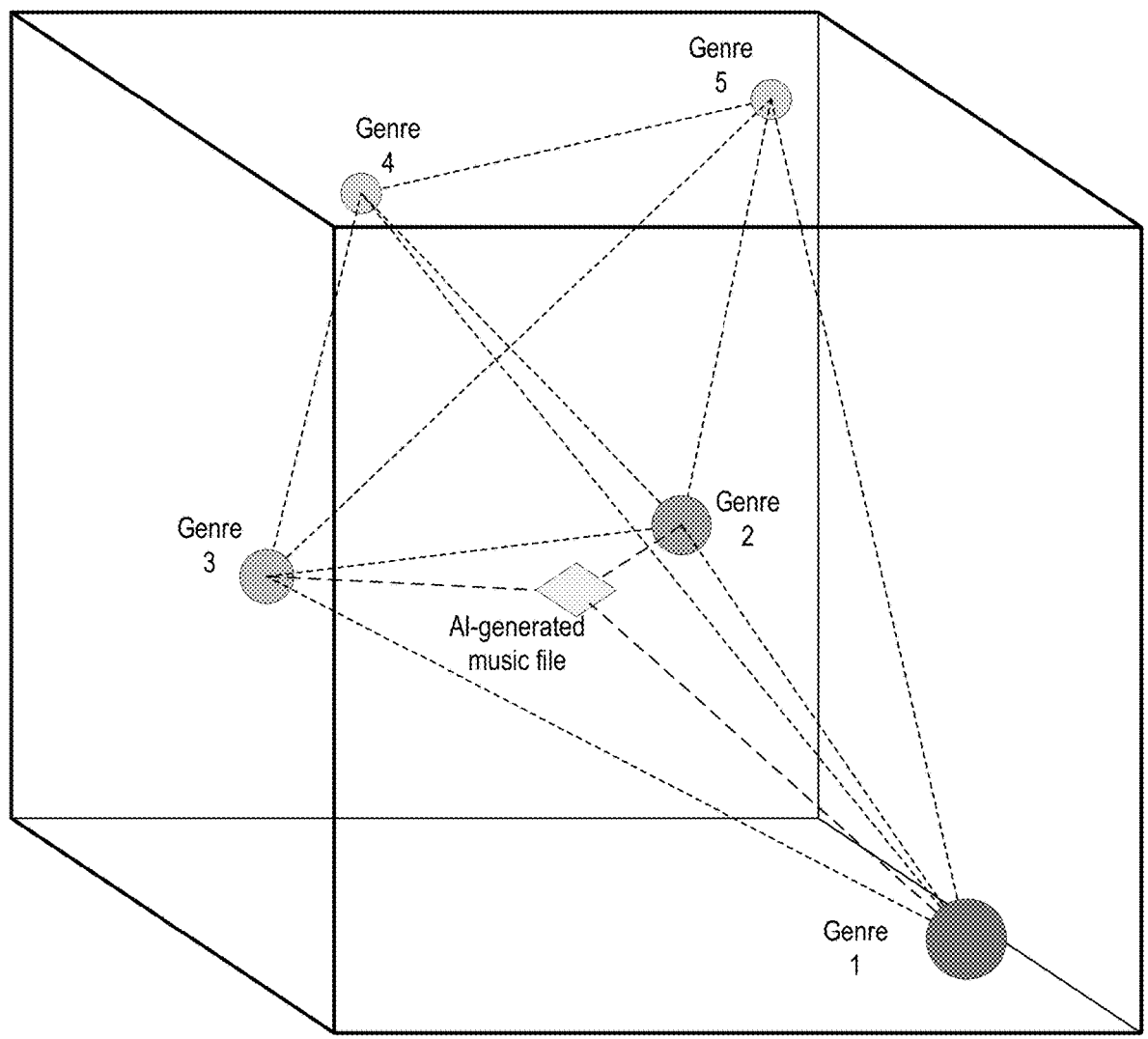
FIG. 7 shows an example three-dimensional visualization of the relationships among musical genres, according to some embodiments.

A visualization technique for similarity data (e.g., MDS 230) is then applied to one or more parameters in the similarity matrix 222 to generate a visualization 240 of the relationships among the music files 240 (e.g., clusters, genres, distances, etc.). Note that, in some embodiments, metadata from the input music files 240 (e.g., genre labels for the music files) may be used to, for example, label clusters or groups of data points in the visualization 240, for example according to genre or artist. The visualization 240 may, for example, be displayed on a client system 190 as illustrated in FIG. 1. The visualization 240 may be a 2D (e.g., as illustrated in FIG. 5) or a 3D (e.g., as illustrated in FIG. 7) graphical representation of the relationship data. While not shown, in some embodiments the music classification and visualization system 110 may further classify/cluster the dataset, for example by applying K-means or other classification or clustering techniques to the output from multi-dimensional scaling 230 to further group the input music files 200 based on one or more patterns. For example, output of the multi-dimensional scaling 230 may indicate a plurality of genres as shown in FIG. 5, and K-means or other techniques may be used to further identify structures in the data as shown in FIGS. 6A and 6B, such as related clusters or "super groups" of genres. Also note that the structural similarity matrix 222 may also be displayed and viewed by a user, for example as a heat map as illustrated in FIG. 4.

FIG. 3 graphically illustrates generating a similarity matrix from input music files, according to some embodiments. A music transform 210 component extracts music data from a set of N music files 200 (e.g., MIDI format music files) and transforms the music data from each music file 200 into a piano roll 310. "Piano roll" refers to a graphical medium or format for graphically representing music data from different instruments. A piano roll is a graphical format that may be used for displaying (and editing) MIDI note data, and may, for example, graphically show the pitch, length, number, and velocity of notes as a matrix. This example piano roll 310 shows pitch on a first axis, and time on a second axis. B is a variable number for time, and C (e.g., 128) is the pitch for a piano roll 210. The music transform 210 component may thus form and output an N*S*B matrix 320, where N is the total number of music files 200, B is a variable number for time, and C (e.g., 128) is the pitch for a piano roll. If there is more than one instrument, then the music transform 210 component may form and output an M*N*S*B matrix 320, where M is the number of instruments.

A structural similarity technique 220 may then be applied to the matrix 320 to calculate the structural similarity among all of the piano rolls 310 to generate a similarity matrix 330. In some embodiments of a structural similarity technique 220, one or more pre-trained neural network models are applied to the matrix 320 to extract one or more features from the matrix 320 (e.g., features extracted from pitch, the length, velocity, and number of notes, and/or other aspects of the music data). In some embodiments, tens or hundreds of features may be extracted. The extracted features may form an N*X*Y matrix, where X*Y are dimensions of the features. A SSIM technique is then applied to the extracted features to generate a similarity matrix 330. The similarity matrix 330 includes all similarity results based on SSIM for the N music files 200, and is an N*N matrix. As shown in FIG. 2, multi-dimensional scaling 230 may then be applied to the similarity matrix 330 to generate a visualization 240 of the relationships among the music files 200. Note that multi-dimensional scaling 230 may generate data in Z dimensions; in embodiments, two or three significant dimensions may be selected for projection into the visualization 240, which may be a 2D or 3D visual representation of the similarity data.

Figure 4:
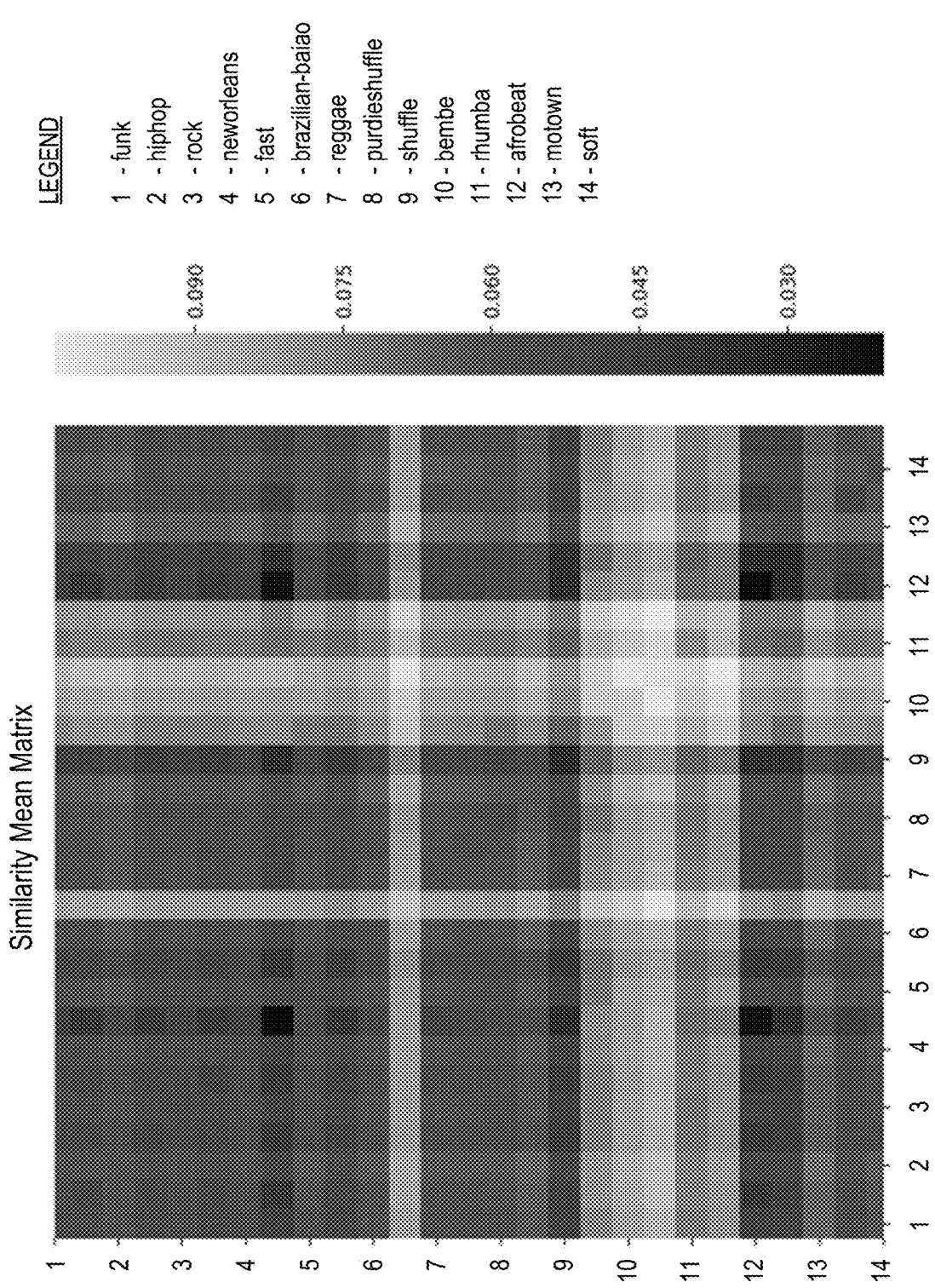
FIG. 4 shows an example similarity matrix for musical genres as a heat map, according to some embodiments.
Figure 5:
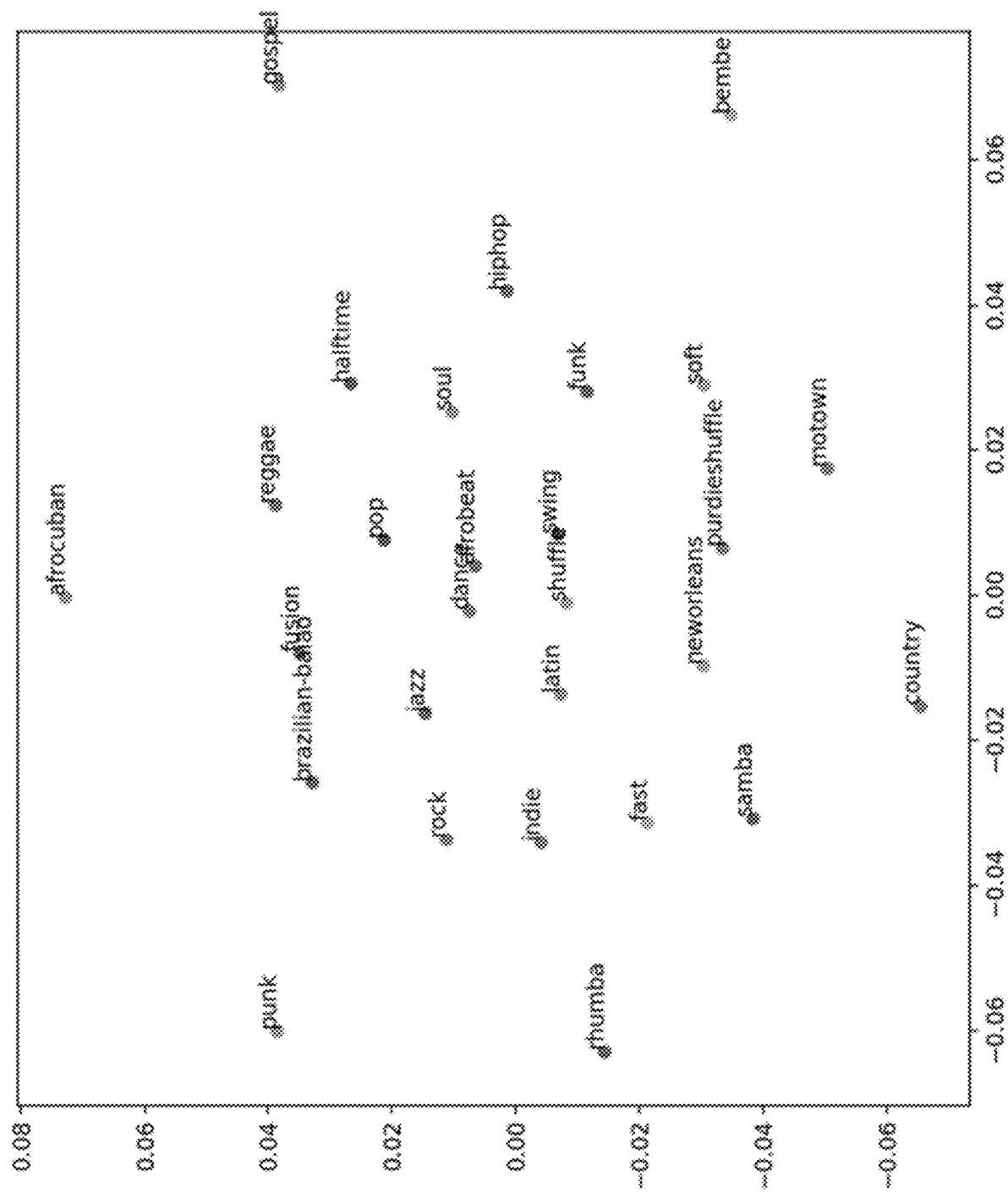
FIG. 5 shows an example two-dimensional visualization of the relationships among musical genres, according to some embodiments.

FIGS. 4 through 6 show example results of applying an embodiment of the music classification and visualization techniques illustrated in FIGS. 2 and 3 to a sample data set. The Groove Dataset is visualized based on genres (which were pre-classified). A goal is to view the similarity of music in the different genres, and to cluster the music/genres if possible.

FIG. 4 shows the example similarity mean matrix for fourteen pre-classified musical genres as a heat map, according to some embodiments. Darker shades correspond to higher similarity, while lighter shades correspond to lower similarity.

FIG. 5 shows an example two-dimensional visualization of the relationships among a set of musical genres, according to some embodiments. Based on the results of the similarity matrix, the relative relationships are calculated and shown in a 2D representation based on Euclidean distance. For instance, 'pop' and 'hiphop' are relatively close to each other, which reveals that they have a higher similarity in music pattern than, for example, 'pop' and 'country'.

FIGS. 6A and 6B show an example two-dimensional visualization of further grouping of the musical genres of FIG. 5 using Euclidian distance, according to some embodiments. In some embodiments, the music can be further grouped based on regions by using the Euclidean distance, for example by applying K-means or other classification or clustering techniques to the output from multi-dimensional scaling to determine clusters of genres as shown in FIG. 6A (six clusters, in this example, each cluster indicated by a dashed line enclosing at least one genre) and to provide a visualization of the related genres, for example as shown in FIG. 6B. In the example of FIG. 6B, "centers" of the six clusters shown in FIG. 6A are shown by the different large geometric shapes, with genres that belong to the clusters shown in similar smaller geometric shapes. Note that, in practice, the shapes that indicate the clusters and genres may be shaded, colored, and/or patterned differently so that the user may more easily visualize the different genres and clusters. Also note that, while FIGS. 5, 6A, and 6B show two-dimensional representations, the classification and clustering of genres may be performed in two, three, or more dimensions.

FIG. 7 shows an example three-dimensional visualization of the relationships among musical genres, according to some embodiments. Five example genres (genres 1-5) are shown as spheres projected into a 3D space, with Euclidian distance between the genres represented by the short-dashed lines between the spheres. FIG. 7 also shows an example AI-generated music file as a diamond; Euclidian distance of the file from genres 1, 2, and 3 are shown by the long-dashed lines. Thus, embodiments may be used to visually evaluate the quality of new AI-generated music by showing how close or far the new music is from a target genre.

Figure 8:
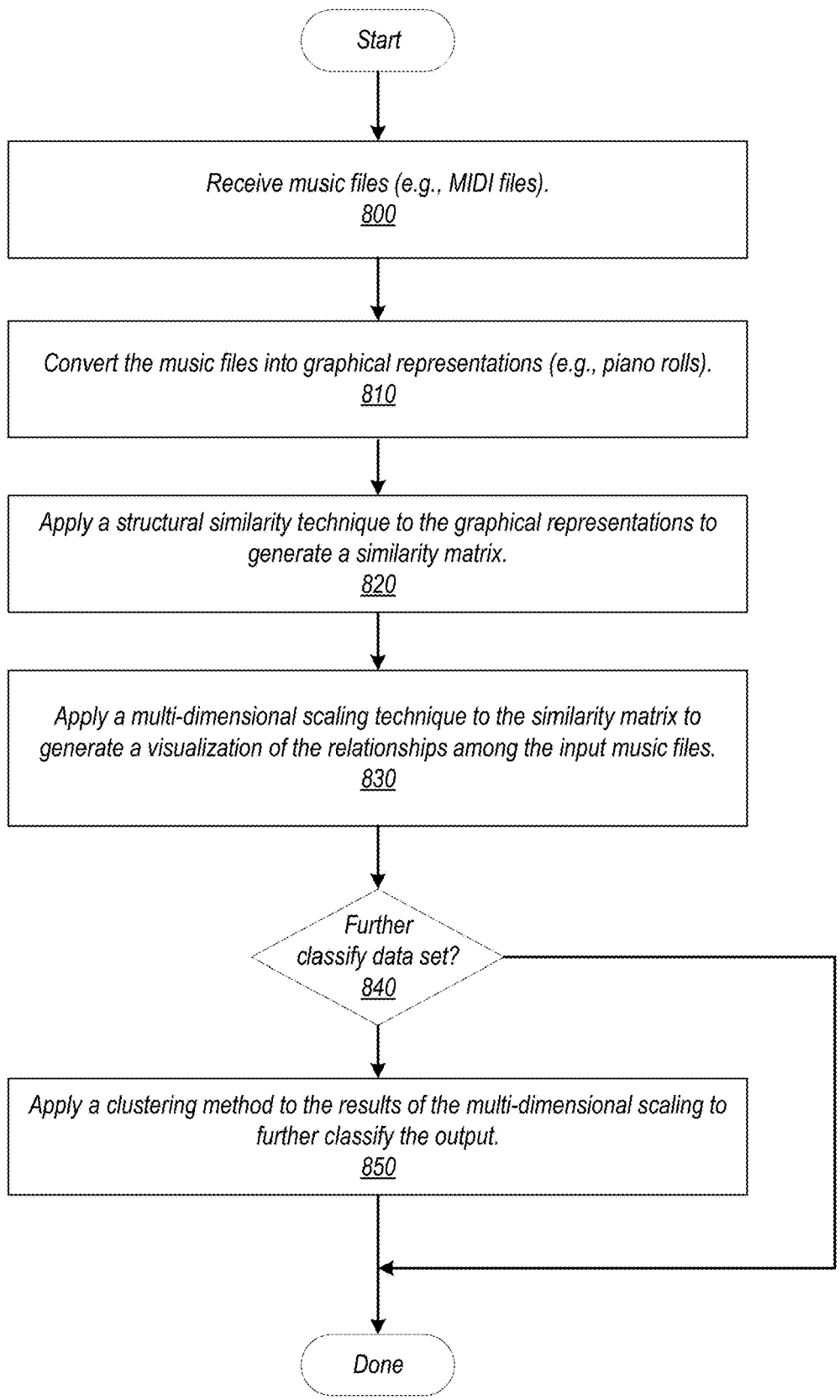
FIG. 8 is a flowchart of a method for music classification and visualization, according to some embodiments.

FIG. 8 is a high-level flowchart of a method for music classification and visualization, according to some embodiments. The method of FIG. 8 may, for example be implemented by a music classification and visualization system 120 as illustrated in FIG. 1. As indicated at 800, a set of music files (e.g., MIDI files) may be received. As indicated at 810, the music files may be converted into graphical representations (e.g., piano rolls). As indicated at 820, a structural similarity technique may be applied to the graphical representations to generate a similarity matrix. As indicated at 830, a multi-dimensional scaling technique may be applied to the similarity matrix to generate a visualization of the relationships among the input music files. At 840, if further classification of the data set is desired, a clustering method (e.g., K-means) may be applied to the results of the multi-dimensional scaling to further classify the output.

Embodiments of the music classification and visualization techniques as illustrated in FIGS. 2 through 8 may have several applications. For example, output of the techniques may be used as an objective metric for evaluating the outputs from machine learning techniques or classification of music. For example, if one or more models have been trained and are used to generate new music using generative machine learning techniques (e.g. GANs), the music classification and visualization techniques may be used to visualize the relationships among the AI-generated music and ground truth data used to train the models. This may help to show how close the AI-generated music is to the ground truth data. For example, referring to FIG. 7, a model may be trained on ground truth data for genre 2 (e.g., a data set of genre 2 music files). The model may then be used to generate new music (e.g., as MIDI files). The new music may then be input to the music classification and visualization system to generate a visualization that shows the relationship between the new music and genres 1 through 5. If the new music is shown as close to or at genre 2 in the visualization, then the genre 2 model may be performing satisfactorily. Otherwise, the model may require further training.

Another example application for the music classification and visualization techniques is that inherent music file (e.g., MIDI) properties may be used to classify a dataset of music files (human-generated, AI-generated, or a combination of both) into several groups based on one or more attributes, including but not limited to genre. For example a data set of music files may be obtained that include metadata indicating various genres of the music files. The data set may be input to the music classification and visualization system to generate a visualization of the music files classified by, for example, genre. As another example, a user may experiment with generating new AI-generated music that may vary from "known" genres. The new music may be input to the music classification and visualization system along with data sets of known genres to visualize the relationship of the new music to known genres. Thus, the user may see which genre(s) their music is closest to, and may even label the AI-generated music as a "new" genre of music based on the visualized relationships.

Music Qualitative Scoring

Figure 9:
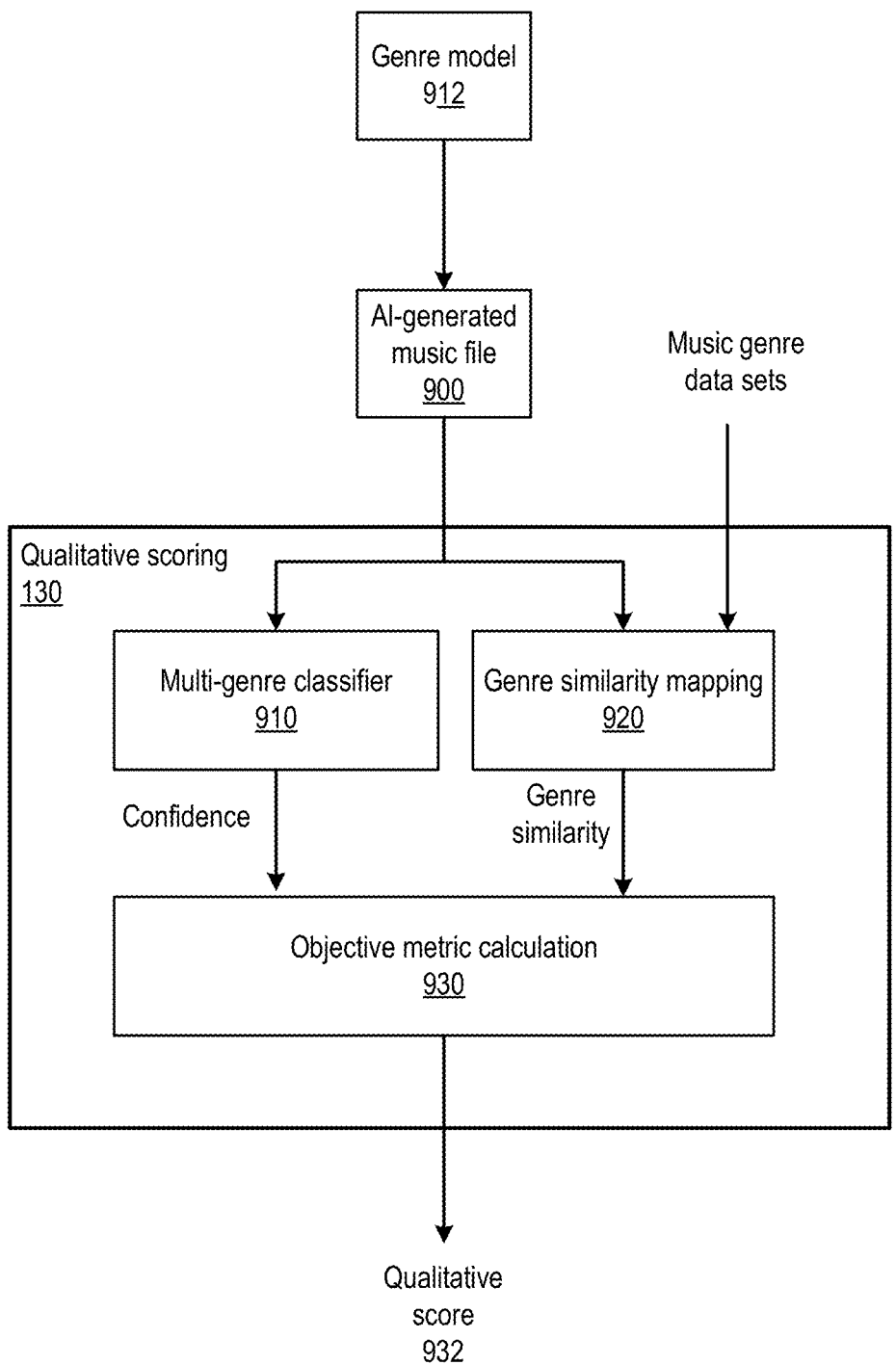
FIG. 9 illustrates a qualitative scoring system for AI-generated music, according to some embodiments.
Figure 10:
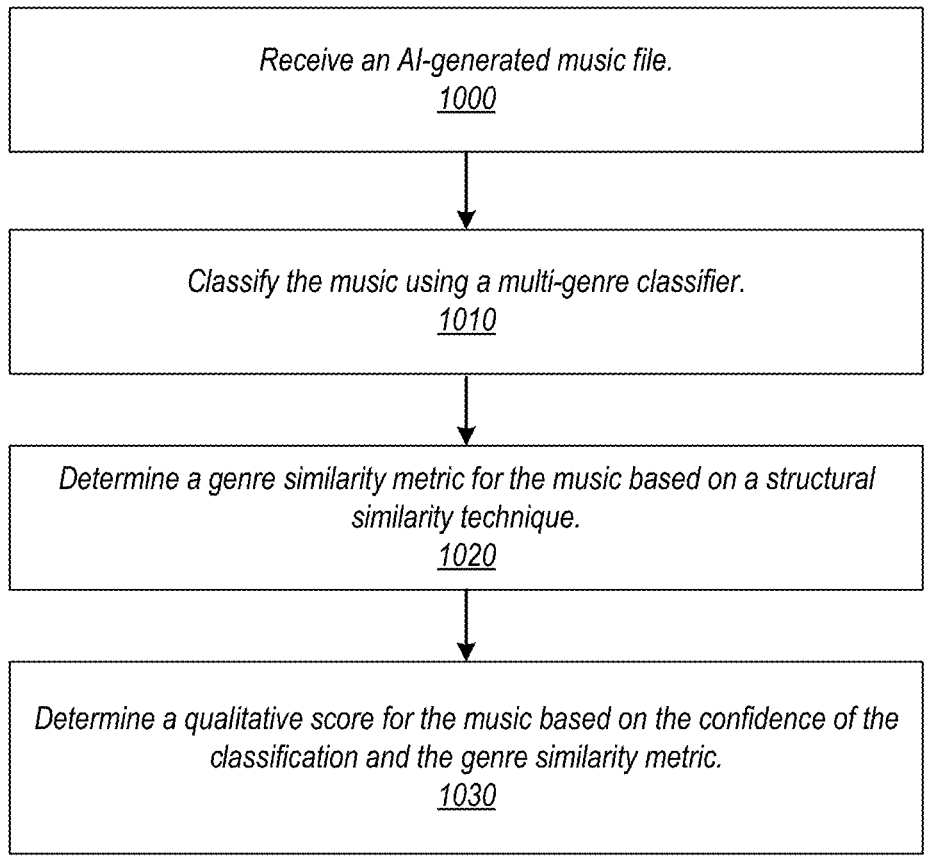
FIG. 10 illustrates a method for generating a qualitative score for AI-generated music, according to some embodiments.

FIGS. 9 and 10 illustrate music qualitative scoring systems and methods, according to some embodiments. The field of generative artificial intelligence has progressed at a remarkable pace, generating more realistic or unique art by the day. Music, as another popular form art, is a natural extension for generative AI. The mostly subjective nature of music, however, makes it difficult to objectively measure the quality of AI-generated musical compositions. Despite this difficulty, an objective measure for the quality of AI-generated music is necessary to give researchers and artists the ability to iterate on their music generative algorithms. While an objective metric for human-crafted music is not obtainable, AI-generated music can be objectively measured by its similarity to (or difference from) the pre-existing genre of music that it was trained on. To put it in another way, if the AI learned from Bach and composes pieces of music indistinguishable from Bach, then the AI has done a good job. Embodiments of systems, methods, and metrics for qualifying AI-generated musical compositions using classification and genre clustering are described. These systems and methods may be referred to as music qualitative scoring systems and methods.

In some embodiments of a qualitative scoring method, a first step to determining a qualitative score for AI-generated musical compositions is classification. A classifier trained on musical genres can provide the ability to classify a new piece of music to a genre. If a set of AI generated musical compositions are fed to the multi-genre classifier, the more often the generated music is able to "trick" its way into being classified as its original genre of music the better. In some embodiments, to generate a multi-genre classifier, the audio output from a data set of ground truth music files (e.g., MIDI files) representing a plurality of genres is first converted to a visual spectrogram, and then a Convolutional Neural Network (CNN) is used to train the multi-genre classifier. With the Groove dataset which contains 17 genres, an approximately 7 times improvement over random guessing (~42% vs ~6%) may be achieved by the trained multi-genre classifier. With the GTZAN dataset which contains 10 genres, an approximate 6 times improvement (~63% vs 10%) may be achieved. If an AI learned from Bach, the goal is to trick the multi-genre classifier into predicting any AI-generated composition as Bach. However, this method alone is too coarse to be an objective metric for music quality, as the AI-generated composition is either a success or a failure and nowhere in-between.

Embodiments of the qualitative scoring method implement techniques to improve on the multi-genre classifier technique described above to thus provide an objective metric for music quality. First, the probability that the multi-genre classifier chose a genre can be analyzed. The difference in probabilities between either a) the predicted genre and the original genre (if the classifier was not tricked) or b) the predicted genre and the next highest probability genre (if the classifier was tricked) may be defined as the classifier confidence. If the multi-genre classifier was successfully tricked, the classifier confidence should be high; if not, the classifier confidence should be low. For example, if the composition was meant to be Bach, but was classified as Beethoven 60% and Bach 40% probability, the classifier confidence would be 20%.

Second, the predicted genres are analyzed similarity to the chosen genre. For example, if the multi-genre classifier predicted the new musical composition as from Beethoven or Mozart, it should result in a higher musical qualitative score than if the new composition was predicted to be from a modern pop artist. As such, the second step is to determine the similarity between two genres. Some embodiments of the qualitative scoring method may utilize a structural similarity technique (SSIM) and a multi-dimensional scaling technique (MDS) to map, visualize, and cluster music compositions based on the similarity between various genres, for example as illustrated for the music classification and visualization methods described herein. Utilizing this technique, embodiments of the qualitative scoring method may extract a genre similarity metric. The genre similarity metric may then be used in combination with output of the multi-genre classifier (specifically, a confidence metric for the classification) to determine an overall objective metric for AI-generated music, for example as described below.

In some embodiments, if the new AI-generated musical composition managed to trick the multi-genre classifier, then the higher the classifier confidence and higher the genre similarity metric the better. As such, the objective metric $O(x)$ is as follows:

$$O(x) = confidence(x,y) * similarity(x,y),$$

where $O(x)$ is the objective metric, x is the predicted and original genre, and y is the second highest probability genre according to the multi-genre classifier.

In some embodiments, if the new AI-generated musical composition failed to trick the multi-genre classifier, then the lower the classifier confidence and the higher the genre similarity the better. As such, the objective metric is as follows:

$$O(x) = -confidence(x,y) * similarity(x,y),$$

where $O(x)$ is the objective metric, x is the predicted and original genre, and y is the second highest probability genre according to the multi-genre classifier.

Thus, embodiments of the qualitative scoring system may provide an objective metric for determining the quality of AI-generated musical compositions utilizing a multi-genre classifier and genre similarity mapping techniques.

FIG. 9 illustrates a qualitative scoring system 130 for AI-generated music, according to some embodiments. The qualitative scoring system 130 may, for example, be implemented in a music generation service 100 as illustrated in FIG. 1. A genre model 912 (e.g., a GAN trained on a data set of music files of a particular target genre) may generate a new music file 900 (e.g., a MIDI file). The music file 900 may be input to a multi-genre classifier 910 component of the system 130 (e.g., a CNN-trained classifier trained on data sets of music files for a plurality of genres including the target genre). The multi-genre classifier 910 may generate a classification (e.g., either that it is or is not of the target genre) along with a confidence in the classification. The music file 900 may also be input to a genre similarity mapping component 920 of the system 130 (or to a music classification and visualization system 120 external to the qualitative scoring system 130) along with the data sets of music files for a plurality of genres including the target genre. Genre similarity and mapping 920 outputs a genre similarity metric for the music file 900. An objective metric calculation component 930 of the qualitative scoring system 130 may then use the genre similarity metric output by genre similarity and mapping 920 in combination with the confidence metric output by the multi-genre classifier 910 to determine an overall objective metric for the AI-generated music file 900, for example as described above.

FIG. 10 is a high-level flowchart of a method for generating a qualitative score for AI-generated music, according to some embodiments. The method of FIG. 10 may, for example be implemented by a music classification and visualization system 120 as illustrated in FIG. 1. As indicated at 1000, an AI-generated music file may be received. For example, the music file may have been generated by a model trained to generate new music of a specific genre. As indicated at 1010, the AI-generated music file may be classified by a multi-genre classifier to generate a classification and a confidence in the classification for the AI-generated music file. As indicated at 1020, a genre similarity metric is determined for the AI-generated music file based on a structural similarity technique. As indicated at 1030, a qualitative score for the AI-generated music file may be determined based on the confidence of the classification and the genre similarity metric.

Example Environments

FIG. 11 illustrates a music generator service implemented on a provider network, according to some embodiments. Embodiments of a music generator service, 2100, a music classification and visualization system 2120, and/or a qualitative scoring system 2130 as illustrated in FIGS. 1 through 10 may be implemented in the context of a service provider that provides virtualized resources (e.g., virtualized computing resources, virtualized storage resources, virtualized database (DB) resources, etc.) on a provider network 2000 to clients 2090 of the service provider, as illustrated in FIG. 11. Virtualized resource instances may be provisioned via one or more provider network services 2002, and may be rented or leased to the clients 2090 of the service. At least some of the resource instances on the provider network 2000 (e.g., computing resources) may be implemented according to hardware virtualization technology that enables multiple operating systems to run concurrently on a host computer, i.e. as virtual machines (VMs) on the host.

The provider network 2000, via the services 2002, may enable the provisioning of logically isolated sections of the provider network 2000 to particular clients as client private networks on the provider network 2000. At least some of a client's resources instances on the provider network 2000 may be provisioned in the client's private network. The provider network 2000, via the services 2002, may provide flexible provisioning of resource instances to clients in which virtualized resource instances can be automatically added to or removed from a client's configuration on the provider network 2000 in response to changes in demand or usage, thus enabling a client's implementation on the provider network 2000 to automatically scale to handle computation and/or storage needs.

Services 2002 may include one or more of, but are not limited to, one or more hardware virtualization services for provisioning computing resource, one or more storage virtualization services for provisioning storage resources, and one or more database (DB) services for provisioning DB resources. In some implementations, a client may access one or more of these services 2002 via respective APIs to provision and manage respective resource instances in respective private networks. However, in some implementations, a client may instead access another service (e.g., music generation service 2100) via an API to the service; the other service may then interact with one or more of the other services 2002 on behalf of the client to provision resource instances.

In some embodiments, the service provider may provide a music generation service 2100 to clients 2090 of provider network 2000. Music generation service 2100 may provide one or more APIs 2102 via which clients 2090 may access the various functionalities of the music generation service 2100. As noted above, the music generation service 2100 may leverage other services 2002 to provision various resources to the clients 2090 on the provider network 2000.

In some embodiments, the music generation service 2100 may include generative machine learning technology 2110 that allows clients 2090, via an interface to an application programming interface (API) 2102 of the music generation service 2100, to train models (e.g., generative adversarial network (GAN) models) and to generate music in particular genres from the models. In some embodiments, the music generation service may include a music classification and visualization system 2120 as described herein. In some embodiments, the music generation service 2100 may include a music qualitative scoring system 2130 as described herein. In some embodiments, the music generation service 2100 may include both a music classification and visualization system 2120 and a music qualitative scoring system 2130. However, in some embodiments, the music classification and visualization system 2120 and/or the music qualitative scoring system 2130 may be implemented as separate services on provider network 2000.

Illustrative System

In at least some embodiments, a computing device that implements a portion or all of the methods and apparatus for providing metrics for the quality, attributes, and relationships of music including AI-generated music as described herein may include a general-purpose computer system that includes or is configured to access one or more computer-accessible media, such as computer system 4000 illustrated in FIG. 12. In the illustrated embodiment, computer system 4000 includes one or more processors 4010 coupled to a system memory 4020 via an input/output (I/O) interface 4030. Computer system 4000 further includes a network interface 4040 coupled to I/O interface 4030.

In various embodiments, computer system 4000 may be a uniprocessor system including one processor 4010, or a multiprocessor system including several processors 4010 (e.g., two, four, eight, or another suitable number). Processors 4010 may be any suitable processors capable of executing instructions. For example, in various embodiments, processors 4010 may be general-purpose or embedded processors implementing any of a variety of instruction set architectures (ISAs), such as the x86, PowerPC, SPARC, or MIPS ISAs, or any other suitable ISA. In multiprocessor systems, each of processors 4010 may commonly, but not necessarily, implement the same ISA.

System memory 4040 may be configured to store instructions and data accessible by processor(s) 4010. In various embodiments, system memory 4020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing metrics for the quality, attributes, and relationships of music including AI-generated music, are shown stored within system memory 4020 as code 4025 and data 4026.

In one embodiment, I/O interface 4030 may be configured to coordinate I/O traffic between processor 4010, system memory 4020, and any peripheral devices in the device, including network interface 4040 or other peripheral interfaces. In some embodiments, I/O interface 4030 may perform any necessary protocol, timing or other data transformations to convert data signals from one component (e.g., system memory 4020) into a format suitable for use by another component (e.g., processor 4010). In some embodiments, I/O interface 4030 may include support for devices attached through various types of peripheral buses, such as a variant of the Peripheral Component Interconnect (PCI) bus standard or the Universal Serial Bus (USB) standard, for example. In some embodiments, the function of I/O interface 4030 may be split into two or more separate components, such as a north bridge and a south bridge, for example. Also, in some embodiments some or all of the functionality of I/O interface 4030, such as an interface to system memory 4020, may be incorporated directly into processor 4010.

Network interface 4040 may be configured to allow data to be exchanged between computer system 4000 and other devices 4060 attached to a network or networks 4050, such as other computer systems or devices as illustrated in FIGS. 1 through 11, for example. In various embodiments, network interface 4040 may support communication via any suitable wired or wireless general data networks, such as types of Ethernet network, for example. Additionally, network interface 4040 may support communication via telecommunications/telephony networks such as analog voice networks or digital fiber communications networks, via storage area networks such as Fibre Channel SANs, or via any other suitable type of network and/or protocol.

In some embodiments, system memory 4020 may be one embodiment of one or more non-transitory computer-readable storage media configured to store program instructions and data as described above for FIGS. 1 through 11 for implementing embodiments of methods and apparatus for providing metrics for the quality, attributes, and relationships of music including AI-generated music. However, in other embodiments, program instructions and/or data may be received, sent or stored upon different types of computer-readable storage media. Generally speaking, a computer-readable medium may include non-transitory storage media or memory media such as magnetic or optical media, e.g., disk or DVD/CD coupled to computer system 4000 via I/O interface 4030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 4000 as system memory 4020 or another type of memory. Further, a computer-readable medium may include transmission media or signals such as electrical, electromagnetic, or digital signals, conveyed via a communication medium such as a network and/or a wireless link, such as may be implemented via network interface 4040.

CONCLUSION

Various embodiments may further include receiving, sending or storing instructions and/or data implemented in accordance with the foregoing description upon one or more non-transitory computer-readable storage media. Generally speaking, a computer-readable medium may include non-transitory storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising;
   one or more processors; and
   memory comprising program instructions that when executed on the one or more processors implement a music classification and visualization system configured to:
      receive N music files, wherein N is greater than one;
      transform music data from the N music files into N two-dimensional matrixes graphically representing the music data, wherein a first dimension of the matrixes includes pitch information and a second dimension of the matrixes corresponds to time;
      apply a structural similarity technique to the N two-dimensional matrixes to generate an N×N similarity matrix for the N music files; and
      apply a multidimensional scaling technique to the similarity matrix to generate a visual representation of relationships among the N music files.

2. The system as recited in claim 1, wherein the music files include MIDI (Musical Instrument Digital Interface) files, and wherein the two-dimensional matrixes are piano rolls.

3. The system as recited in claim 1, wherein the structural similarity technique classifies the music files into a plurality of groups based on one or more attributes of the music files, wherein the one or more attributes include music genre, and wherein the visual representation of relationships among the music files shows one or more of distance between the music files, distance between groups of the music files, or distance between a music file and a one or more groups of music files.

4. The system as recited in claim 1, wherein the music files include at least one music file generated using generative machine learning technology.

5. The system as recited in claim 1, wherein the memory further comprises program instructions that when executed on the one or more processors implement a music qualitative scoring system configured to:
   receive an Artificial Intelligence (AI) generated music file generated using generative machine learning technology;
   input the AI generated music file to a multi-genre classifier to generate a classification for the music file and a confidence metric for the classification;
   input the AI generated music file to the music classification and visualization system to determine a genre similarity metric for the music file; and
   determine a qualitative score for the AI generated music file based on the confidence metric and the genre similarity metric.

6. The system as recited in claim 5, wherein the music classification and visualization system and the music qualitative scoring system are components of a music generation service configured to generate new music based on the generative machine learning technology.

7. A method, comprising:
   performing, by a music classification and visualization system implemented by one or more computing devices:
      transforming music data from a plurality of music files into a plurality of graphical representations of the music data;
      applying a structural similarity technique to the plurality of graphical representations to generate a similarity matrix for the plurality of music files; and
      applying a multidimensional scaling technique to the similarity matrix to generate a visual representation of relationships among the plurality of music files.

8. The method as recited in claim 7, wherein the music files include MIDI (Musical Instrument Digital Interface) files, and wherein the graphical representations are piano rolls.

9. The method as recited in claim 7, wherein the music files include audio music files, and wherein the graphical representations are spectrograms.

10. The method as recited in claim 7, wherein the structural similarity technique classifies the music files into a plurality of groups based on one or more attributes of the music files, wherein the one or more attributes include music genre.

11. The method as recited in claim 10, wherein the visual representation of relationships among the music files shows one or more of distance between the music files, distance between groups of the music files, or distance between a music file and a one or more groups of music files.

12. The method as recited in claim 7, wherein the visual representation of relationships among the music files is a two-dimensional visual representation or a three-dimensional visual representation, the method further comprising displaying the visual representation on a computing device.

13. The method as recited in claim 7, wherein the music files include at least one music file generated using generative machine learning technology.

14. The method as recited in claim 7, further comprising applying a clustering technique to output of the multidimensional scaling technique to further classify the music files.

15. The method as recited in claim 7, further comprising performing, by a music qualitative scoring system implemented by the one or more computing devices:
   inputting an Artificial Intelligence (AI) generated music file to a multi-genre classifier to generate a classification for the music file and a confidence metric for the classification;
   inputting the AI generated music file to the music classification and visualization system to determine a genre similarity metric for the music file; and
   determining a qualitative score for the AI generated music file based on the confidence metric and the genre similarity metric.

16. The method as recited in claim 15, wherein the music classification and visualization system and the music qualitative scoring system are components of a music generation service configured to generate new music based on generative machine learning technology.

17. The method as recited in claim 16, wherein the music generation service is implemented as a service on a provider network, and wherein the music generation service provides at least one application programming interface (APIs) via which clients of the provider network may access functionalities of the music generation service including the generative machine learning technology, the music classification and visualization system, and the music qualitative scoring system.

18. One or more non-transitory computer-readable storage media storing program instructions that when executed on or across one or more processors cause the one or more processors to:
   receive a plurality of music files;
   transform music data from the plurality of music files into a plurality of graphical representations of the music data;
   apply a structural similarity technique to the plurality of graphical representations to generate a similarity matrix for the plurality of music files; and
   apply a multidimensional scaling technique to the similarity matrix to generate a visual representation of relationships among the plurality of music files.

19. The one or more non-transitory computer-readable storage media as recited in claim 18, wherein the music files include MIDI (Musical Instrument Digital Interface) files, and wherein the graphical representations are piano rolls.

20. The one or more non-transitory computer-readable storage media as recited in claim 18, wherein the structural similarity technique classifies the music files into a plurality of groups based on one or more attributes of the music files, wherein the one or more attributes include music genre, and wherein the visual representation of relationships among the music files shows one or more of distance between the music files, distance between groups of the music files, or distance between a music file and a one or more groups of music files.

21. The one or more non-transitory computer-readable storage media as recited in claim 18, wherein the music files include at least one music file generated using generative machine learning technology.

22. The one or more non-transitory computer-readable storage media as recited in claim 18, further storing program instructions that when executed on or across the one or more processors further cause the one or more processors to apply a clustering technique to output of the multidimensional scaling technique to further classify the music files.

23. The one or more non-transitory computer-readable storage media as recited in claim 18, further storing program instructions that when executed on or across the one or more processors further cause the one or more processors to:
   receive an Artificial Intelligence (AI) generated music file generated using generative machine learning technology;
   input the AI generated music file to a multi-genre classifier to generate a classification for the music file and a confidence metric for the classification;
   input the AI generated music file to the music classification and visualization system to determine a genre similarity metric for the music file; and
   determine a qualitative score for the AI generated music file based on the confidence metric and the genre similarity metric.

* * * * *